United States Patent [19]
Ives

[11] 3,827,762
[45] Aug. 6, 1974

[54] BRAKING SYSTEMS FOR VEHICLES
[75] Inventor: Andrew Peter Ives, Solihull, England
[73] Assignee: Joseph Lucas (Industries) Limited, Brimingham, England
[22] Filed: Mar. 7, 1973
[21] Appl. No.: 338,945

[30] Foreign Application Priority Data
Mar. 18, 1972   Great Britain.................... 12793/72

[52] U.S. Cl.................................. 303/21 F, 91/29
[51] Int. Cl............................................. B60t 8/06
[58] Field of Search............ 303/21 F, 21 AF, 21 A, 303/40; 246/182 B; 91/28, 29, 189; 188/355

[56] References Cited
UNITED STATES PATENTS
3,394,721   7/1968   Ifield................................. 91/189 X
3,402,972   9/1968   Cooper et al. ............... 246/182 B X
3,708,213   1/1973   Skoyles............................ 303/21 AF
3,745,522   7/1973   Inada et al................... 303/21 AF X
3,747,992   7/1973   Schnipke .............................. 303/40

Primary Examiner—Lloyd L. King
Assistant Examiner—Randolph A. Reese
Attorney, Agent, or Firm—Hill, Gross, Simpson, Van Santen, Steadmen, Chiara & Simpson

[57] ABSTRACT
In a vehicle braking system the brakes of the vehicle are controlled automatically in some circumstances, for example during potential skidding. A vacuum actuator provides servo-assistance in the system, and a comparator receives a signal representing the required braking pressure and a further signal representing actual braking pressure. This latter signal is obtained by measuring the pressure drop across the vacuum actuator. The comparator controls the braking pressure.

1 Claim, 1 Drawing Figure

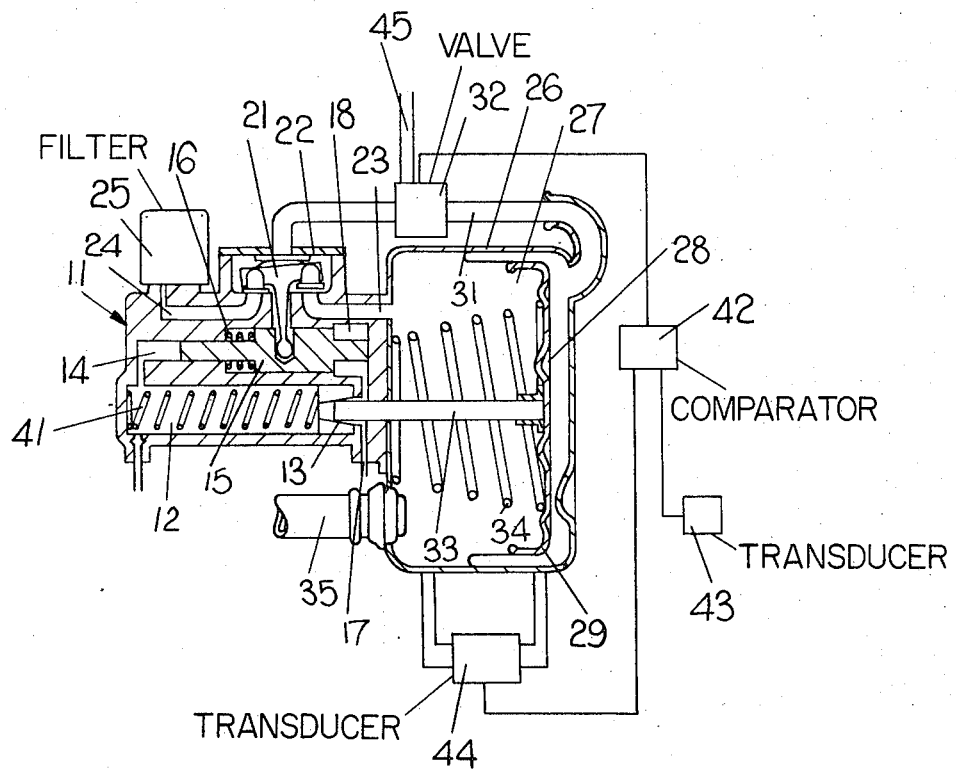

BRAKING SYSTEMS FOR VEHICLES

This invention relates to braking systems for vehicles, particularly road vehicles, in which the brakes of the vehicle are, at least in some circumstances, controlled automatically. One application of the invention is in a headway control system for a road vehicle, in which the distance between and the relative speeds of two vehicles are measured, and the brakes of the following vehicle are automatically controlled to maintain a safe distance between the vehicles.

A system according to the invention includes means for applying the brakes of the vehicle, said means incorporating a vacuum actuator providing servo-assistance in the system, and a comparator which receives a signal representing the required braking pressure, and a further signal which represents actual braking pressure and is obtained by measuring the pressure drop across the vacuum actuator, the comparator producing an output which is used to control the braking pressure.

The accompanying drawing illustrates, partly in section and partly diagrammatically, one example of the invention.

The drawing shows an arrangement as applied to a road vehicle having a servo-assisted braking system. The arrangement includes a body part 11 having a chamber 12 connected to the wheel cylinders of the vehicle, the chamber 12 containing a piston 13. The chamber 12 communicates with a passage 14 within which is contained one end of a stepped control piston 15 which is urged by a spring 16 to the position shown in which the other end of the piston 15 engages a wall of the body part 11. The piston 15 can be moved against the action of the spring 16 by pressure applied through a passage 17 to a chamber 18, the passage 17 being connected to the master cylinder of the braking system, so that when the brake pedal is depressed, pressure is applied by way of the passage 17 to move the piston 15 against the action of the spring 16 and increase the pressure within the passage 14, so applying the brakes even if no servo-assistance is available.

Connected to the control piston 15 is a valve member 21 which when the brakes are not applied occupies the position shown in which it establishes communication between a chamber 22 and a passage 23 in the body part 11, but blocks communication between the chamber 22 and a passage 24 which is connected to atmosphere through a filter 25.

Connected to the body part 11 is a casing 26 which is divided into two chambers 27, 28 by a diaphragm 29. The chamber 27 communicates with the passage 23, and the chamber 28 communicates by way of a passage 31 with the chamber 22, the passage 31 incorporating a valve 32 which connects chamber 28 to chamber 22 or to passage 45, depending upon the state of the valve, passage 45 being connected to atmosphere. Connected to the diaphragm 29 is a rod 33 which extends through the body part 11 and is connected to the piston 13. Moreover, the diaphragm 29 is urged in a direction to decrease the size of the chamber 28 by a spring 34 within the chamber 27, which is in communication by way of a passage 35 with the inlet manifold of the engine.

Ignoring for the moment the valve 32, the operation of the system is as follows. When the brake pedal is depressed, the brakes will be applied, as previously explained, even if no servo-assistance is available. With the parts in the position shown, the pressure in the chamber 27 is equal to the pressure in the chamber 28, since these chambers are in communication by way of the passage 23, the chamber 22 and the passage 31. When the brakes are applied, the control piston 15 moves against the action of the spring 16, so closing the passage 23 and opening the passage 24. Air can now flow from the inlet 25 into the chamber 28, and since the chamber 27 is now connected only to the inlet manifold, the diaphragm 29 moves against the action of the spring 34 so that the piston 13 moves against the action of a spring 41 within the chamber 12 to apply the brakes of the vehicle. It will be appreciated that the diaphragm 29 and its associated components effectively form a vacuum actuator which provides the required servo-assistance.

There is further provided a comparator 42 which receives an electrical signal from the transducer 43 representing desired braking pressure. The comparator 42 also receives a signal from a transducer 44 which is connected to opposite sides of the diaphragm 29 so as to measure the pressure drop across the diaphragm 29. This pressure drop is a measure of the actual braking pressure, and so the comparator 42 receives signals representing the actual and desired braking pressures, and produces an output dependent upon the difference, this output operating the valve 32 such that when the signal representing the desired braking pressure is greater than the signal representing actual braking pressure the valve is set into a position such that chamber 28 is connected to passage 45 and allows air to enter chamber 28 and when the signal representing the desired braking pressure is less than the signal representing actual braking pressure the valve 32 is set into a position such that chamber 28 is connected to chamber 27 via passage 23 and chamber 22 which allows air to be drawn out of chamber 28. It will be appreciated therefore that when the desired braking pressure has been reacted the valve 32 will oscillate to maintain substantially that pressure in chamber 28. In one particular application, the comparator 42 forms part of a headway control system in which radar equipment on a vehicle detects the speed of approach of the vehicle relative to the vehicle it is following, and also the distance between the vehicles, and automatically controls the braking pressure to maintain a safe distance between the vehicles. In these circumstances, the comparator 42 only operates when the headway control system is being utilised, for example during motorway travel.

The exact form of the transducer 44 is not important, but it could, by way of example, be a carbon pile pressure sensor or a simple diaphragm which is used to operate a potentiometer. However, any other form of differential pressure transducer, which may for example vary a capacitance, can be utilized. The great advantage of detecting the braking pressure by measuring the pressure across the diaphragm 29 is that the pressures measured are much smaller than the actual braking pressures, although they are related to the braking pressures, and so a considerably cheaper transducer 44 can be employed.

I claim:

1. A braking system for a vehicle, in which the brakes of the vehicle are, at least in some circumstances, controlled automatically, including means for applying the brakes of the vehicle, said means incorporating a vacuum actuator providing servo-assistance in the system, and a comparator which receives a signal representing the required braking pressure, and a further signal which represents actual braking pressure and is obtained by measuring the pressure drop across the vacuum actuator, the comparator producing an output which is used to control the braking pressure.

* * * * *